Aug. 23, 1938.　　　O. C. LINTHWAITE　　　2,127,743
ENGINE
Filed May 6, 1935　　　7 Sheets-Sheet 2

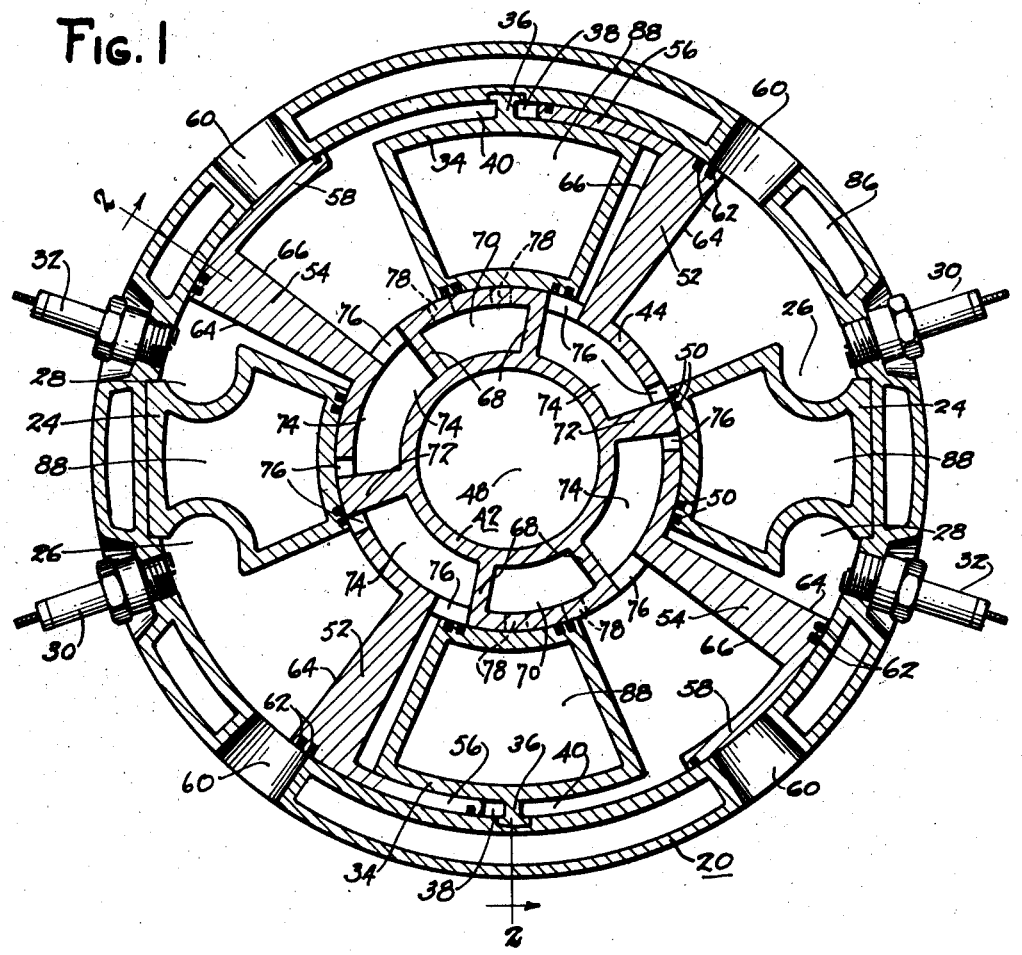

INVENTOR.
OWEN C. LINTHWAITE
BY
Q. E. Wilson
ATTORNEY.

Aug. 23, 1938.  O. C. LINTHWAITE  2,127,743
ENGINE
Filed May 6, 1935  7 Sheets-Sheet 3

INVENTOR.
OWEN C. LINTHWAITE
BY G. E. Wilson
ATTORNEY

Aug. 23, 1938.  O. C. LINTHWAITE  2,127,743
ENGINE
Filed May 6, 1935  7 Sheets-Sheet 4

INVENTOR.
OWEN C. LINTHWAITE
BY  P. E. Wilson
ATTORNEY.

Aug. 23, 1938.  O. C. LINTHWAITE  2,127,743
ENGINE
Filed May 6, 1935  7 Sheets-Sheet 6

INVENTOR.
OWEN C. LINTHWAITE
BY *A. E. Wilson*
ATTORNEY.

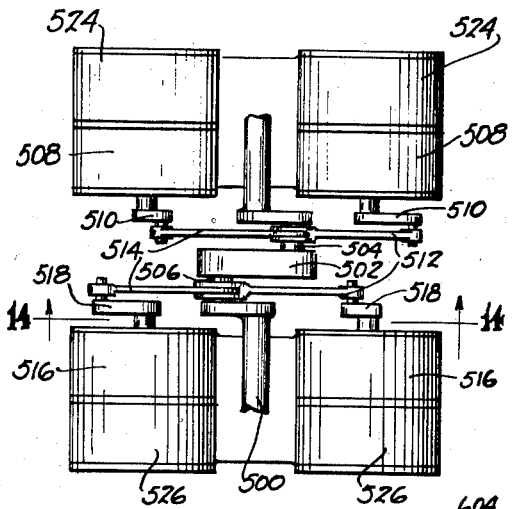
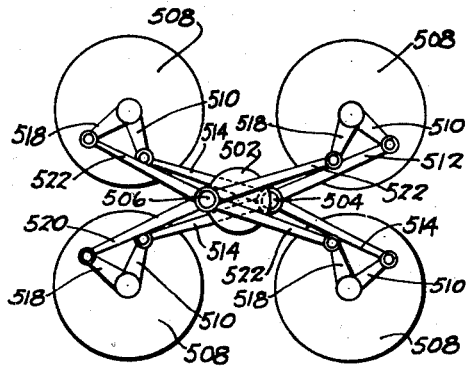
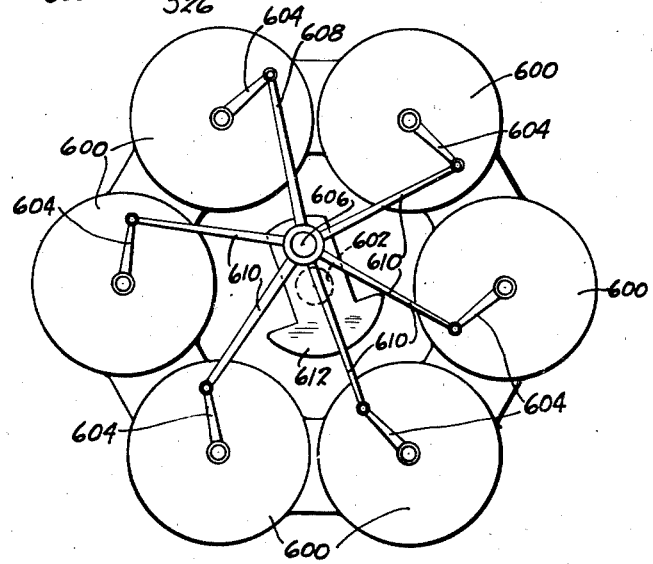
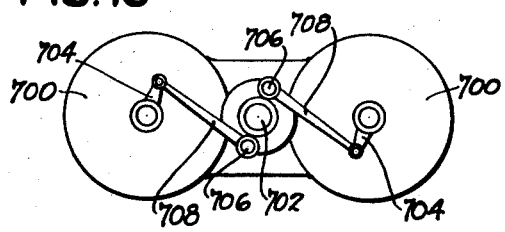

Patented Aug. 23, 1938

2,127,743

UNITED STATES PATENT OFFICE 2,127,743

ENGINE

Owen C. Linthwaite, South Bend, Ind., assignor to Bendix Products Corporation, South Bend, Ind., a corporation of Indiana Application May 6, 1935, Serial No. 20,035

5 Claims. (Cl. 123—18)

This invention relates to engines and more particularly to a two-cycle engine having an oscillating element.

An object of the invention is to produce a two-cycle oscillating engine wherein power impulses are exerted upon the oscillating element simultaneously at opposite ends of the element.

A further object of the invention is to provide improved means for admitting a charge of combustible mixture to the engine to provide increased efficiency of the engine.

A still further object of the invention is to provide novel supercharging means for injecting a charge of combustible mixture to the engine.

A further object of the invention is to provide more efficient means for cooling the engine.

Another object of the invention is to provide means for injecting a quantity of free air to the combustion chambers, and subsequently injecting a rich emulsion of fuel and air into the combustion chambers to produce a suitable combustible charge.

A further object of the invention is to provide an improved fluid pressure seal of simple design.

A still further object of the invention is to provide an engine of the two-cycle oscillating type wherein the power units may be disposed at different angles with respect to each other to facilitate positioning the engine in any available space.

Another object of the invention is to provide an improved linkage interconnecting a blower and a power unit, wherein the effective stroke of the blower may be increased and the direction of oscillation of the blower reversed with respect to the direction of oscillation of the power unit to damp out vibration in the engine.

A still further object of the invention is to provide novel means for transferring periodic oscillating movement of an element into continuous rotary motion of a shaft.

Another object of the invention is to provide an improved double-acting supercharger to increase compression ratios of the engine.

A further object is to provide a motor having an inbuilt supercharger to increase the compression ratio of the engine.

Another object of the invention is to provide novel means for successively admitting a charge of free air, and a rich emulsion of fuel and air to the combustion chamber of an engine as a movable element oscillates.

A still further object is to provide an improved fluid-cooled oscillating element of a two-cycle engine.

Another object is to produce a powerful engine of simple design, which may be manufactured at reduced cost.

A still further object is to provide an improved symmetrically balanced engine of simple design and construction.

Other objects and advantages of this invention will be apparent from the following detailed description thereof, considered in connection with the accompanying drawings, submitted for purposes of illustration only and not intended to define the scope of the invention, reference being had for that purpose to the subjoined claims.

In the drawings, wherein similar reference characters refer to similar parts throughout the several views:

Figure 1 is a sectional view through a portion of an engine embodying the present invention;

Figure 2 is a view taken on the line 2—2 of Figure 1;

Figure 13 is a plan view illustrating another desirable lay-out;

Figure 14 is an elevational view showing the linkage connecting the power elements of Figure 13;

Figure 15 illustrates an embodiment of the invention wherein power units are symmetrically disposed about a common crankshaft; and Figure 16 is a view illustrating a further embodiment of the invention adapted particularly to an engine of small size.

Figure 3:
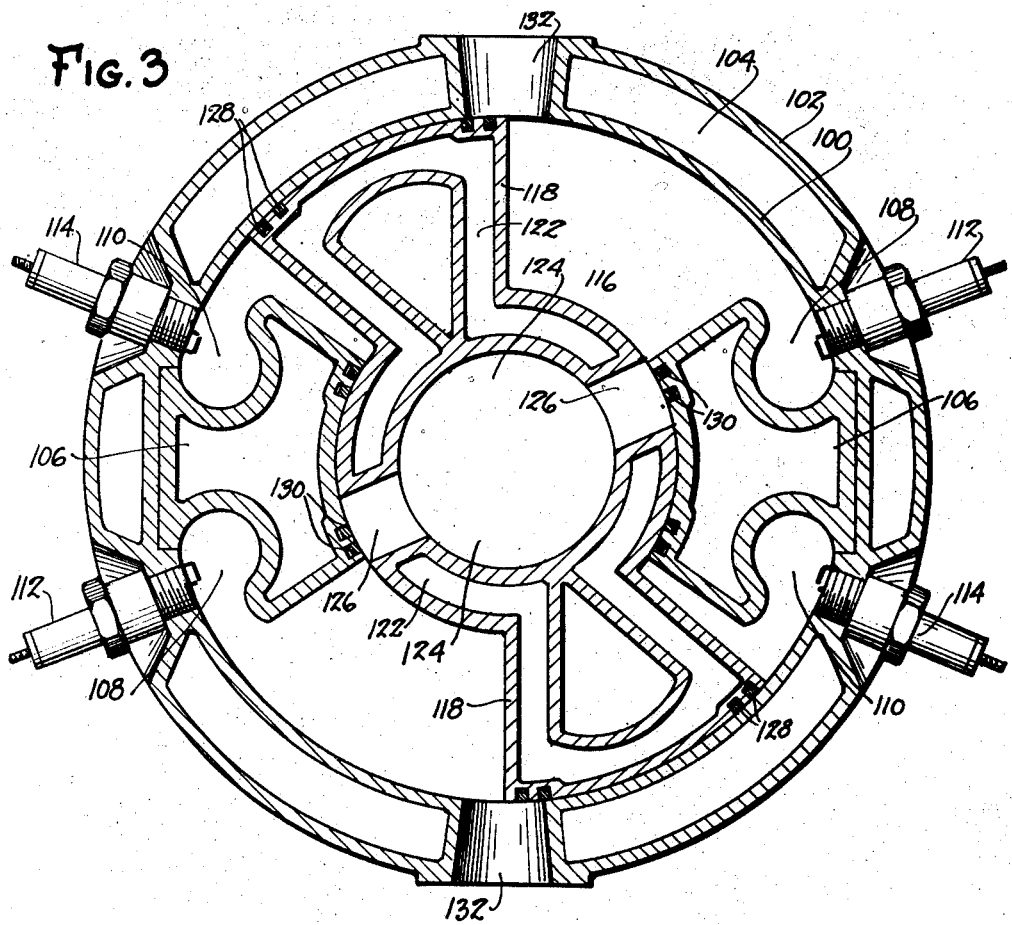
Figure 3 is a view similar to Figure 1 showing another desirable embodiment of the invention.

Referring more particularly to Figures 1 and 2, there is shown one desirable embodiment of the invention wherein a water jacketed cylinder 20 is disposed longitudinally on a shaft 22. Two symmetrically disposed arcuate-shaped cylinder blocks 24 are positioned within the cylinder 20 at opposite sides thereof, and are dovetailed into the walls of the cylinder as shown. The portions of the cylinder blocks 24, adjacent the cylinder 20, are provided with cut-out sections or indentations to form part of the combustion chambers 26 and 28 on opposite sides of the blocks 24. Spark plugs 30 and 32 project through the walls of the cylinder 20, and communicate with the combustion chambers 26 and 28 respectively. Two additional symmetrically disposed arcuate-shaped cylinder blocks 34 are positioned within the cylinder 20, at opposite sides thereof, midway between the cylinder blocks 24. The cylinder blocks 34 are dovetailed into the walls of the cylinder 20 by means of supporting fins 36. As will be seen from the drawings, annular-shaped slots 38 and 40 are formed between the cylinder 20 and the cylinder blocks 34 on opposite sides of the supporting fins 36.

A movable member, fixed to the shaft 22, is positioned within the cylinder 20. This movable member comprises a pair of longitudinally extending concentric cylinders 42 and 44. The cylinder 42 is shorter longitudinally than the cylinder 44, being closed by a partition wall 46 to form an annular chamber 48. A cylindrical chamber 47, bounded by the cylinder 44 and the partition wall 46, is thus formed within the cylinder 20.

The outer edge of the cylinder 44 lies closely adjacent to the inner ends of the cylinder blocks 24 and 34, being separated therefrom, in fluid-tight relation, by means of scraper rings 50 carried by the cylinder blocks 24 and 34.

The cylinder 44 is provided with two pairs of diametrically opposed blade members 52 and 54 respectively, extending into the spaces between the cylinder blocks 24 and 34. The blade members 52 and 54 are provided with shroud members 56 and 58 respectively, adapted to engage the inner wall of the cylinder 20 to hold the exhaust ports 60 closed during certain periods of operation. The blade members 52 and 54 are provided with rings 62, adapted to engage the inner wall of the cylinder 20 to prevent fluid from passing between the ends of the blades 52 and 54 and the cylinder 20. The shroud members 56 and 58 are suitably shaped to be received within the annular-shaped slots 38 and 40 respectively, formed between the cylinder 20 and the cylinder blocks 34 on opposite sides of the supporting fins 36.

The blade members 52 and 54 oscillate back and forth between the cylinder blocks 24 and 34. The side of the blade members 52 and 54, adjacent the cylinder blocks 24, are subjected to the explosion in the combustion chambers 26 and 28 and are hereinafter referred to as the combustion surfaces, indicated by the numeral 64. The opposite sides of the blade members 52 and 54, that is the sides adjacent the cylinder blocks 34, are referred to as the compression surfaces, and are indicated by the reference numerals 66.

The space between the cylinders 42 and 44 is separated longitudinally by two pairs of diametrically opposed rigidifying flanges 68, to form two arcuate-shaped chambers 70 which may be used for the circulation of water or other cooling fluid if desired. The space between the cylinders 42 and 44 is also separated longitudinally by two diametrically opposed rigidifying flanges 72 intermediate the chambers 70 to form four spaced by-pass chambers 74. The by-pass chambers 74 communicate by way of spaced ports 76 in the walls of the cylinder 44 with the space between the cylinder blocks 24 and 34 on the compression side 66 of the blade members 52 and 54 under certain conditions of operation.

The cylindrical chamber 47 communicates with the space between the cylinder blocks 24 and 34 on the compression side 66 of the blade members 52 and 54 by means of ports 78 extending through the walls of the cylinder 44. The ports 78 are closed by the inner surface of the cylinder blocks 34 during the greater portion of the oscillation of the shaft 22 as shown by the drawings.

A combustible charge of fuel and air is supplied to the cylindrical chamber 47 by means of a carburetor 80 connected thereto, and controlled in the usual manner by a choke valve 82 and a throttle valve 84.

As previously indicated, the cylinder 20 is water jacketed to provide a space 86 for the circulation of water or other suitable cooling medium. The cylinder blocks 24 and 34 are hollow to provide a space 88 for the circulation of water or other suitable cooling medium. Adequate cooling facilities are thus provided to prevent the temperature of the engine from exceeding a safe operating temperature.

In the operation of this device the shaft 22 oscillates back and forth, reversing direction each time the blade members 52 and 54 move between the cylinder blocks 24 and 34. Assume that the blade members 54 are at the beginning of a power stroke, wherein the compression faces 64, of the blade members 54, are positioned adjacent the cylinder blocks 24, and the compression faces 66 of the blades 52 are positioned adjacent the cylinder blocks 34. A spark is then fired in the spark plugs 32, igniting the combustible charge compressed in the compression chambers 28 to move the blades 54 in the clockwise direction. During this period of operation the blade members 52, also rotating in the clockwise direction, move away from the cylinder blocks 34, thereby decreasing the pressure within the space between the compression side 66 of the blades 52 and the cylinder blocks 34, the skirts carried by the blades 52, being withdrawn from the annular-shaped slots 38.

As the combustion stroke continues, the combustible charge contained within the space between the compression side 66 of the blade member 54 is compressed and is forced through the ports 76 into the by-pass chambers 74. A high pressure is therefore obtained within the chamber 74.

As the compression stroke continues further, the compression faces 64, of the blade members 54, uncover the edge of the exhaust port 60, thereby permitting the fire of combustion to escape through the port 60. Shortly after the exhaust port 60 is opened, a port 76 in the cylinder 44 moves away from the cylinder blocks 24, to bypass the compressed gases in the chamber 74 into the space between the cylinder blocks 24 and the combustion surfaces 64 of the blade members 54. The compressed gases rush into the chamber and aid in the scavenging of the products of combustion through the exhaust port 60, and supply a fresh combustible charge for the next cycle of operation.

During this cycle of operation the blade members 52 have rotated in the clockwise direction to compress a combustible charge between the cylinder blocks 24 and the combustion faces 64 of the blade members 52. A decreased pressure is simultaneously effected between the compression faces 66 of the blade members 52 and the cylinder blocks 34. Toward the end of the stroke the port 78 in the walls of the cylinder 44, is uncovered by the cylinder block 34, to permit a fresh combustible charge to be drawn into the space between the cylinder blocks 34 and the compression faces 66 of the blade members 52, from the carburetor 80.

At the end of this cycle of operation a combustible charge is then compressed between the combustion surfaces 64 of the blade members 52 and the cylinder blocks 24. This charge is then ignited by the spark blocks 30, whereupon the blade members 52 are urged in the counterclockwise direction on the power stroke. The charge previously drawn through the port 78 is then compressed into the chamber 74, between the concentric cylinders 42 and 44 preparatory to being by-passed beyond the blades 52 at the end of this power stroke. A power stroke is effected each time the blades 52 and 54 approach the cylinder blocks 24.

It will be noted that as the blocks 54 are undergoing a power stroke, the blades 52 are compressing a charge between the combustion surfaces 64 and the cylinder blocks 24 for the next power stroke in the reverse direction. A cushioning action is thus provided which will prevent excessive jerking of the engine, and operate to uniformly accelerate the shaft 22 at the beginning of the power stroke and to uniformly decelerate the shaft 22 at the end of the power stroke. It will be understood, of course, that the speed of oscillation of the shaft 22 may be controlled manually by manipulating the throttle valve 84 of the carburetor 80.

Figure 5:
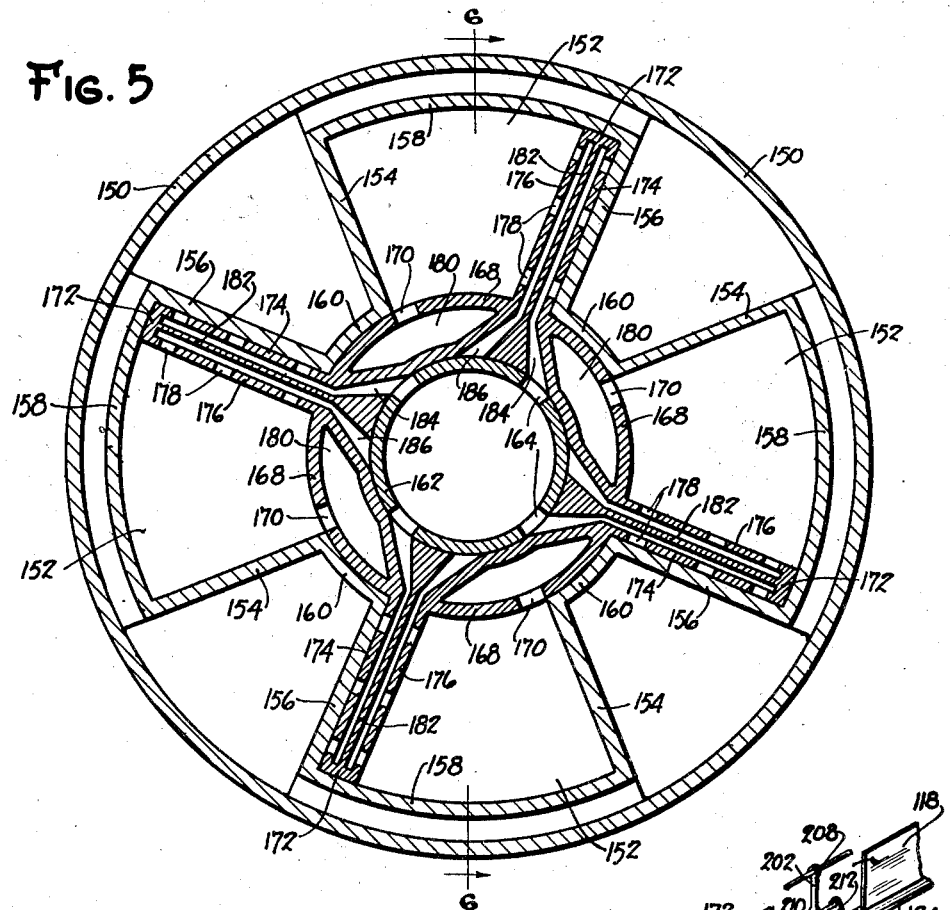
Figure 5 is an elevational view illustrating an improved blower particularly adapted for use in connection with the embodiment of the invention illustrated in Figure 3.
Figure 6:
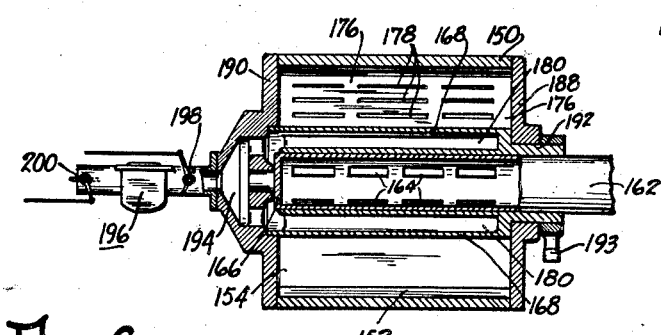
Figure 6 is a view taken substantially on the line 6—6 of Figure 5.

Figures 3, 5 and 6 illustrate another desirable embodiment of the invention wherein a longitudinally disposed power cylinder is provided with novel supercharging means to compress the combustible charge supplied to the combustion chambers.

The power cylinder comprises an inner wall 100, an outer wall 102, and a fluid circulating passage 104 interposed therebetween. Fixed arcuate-shaped cylinder blocks 106 are positioned within the cylinder and are dovetailed into the inner wall 100 as shown. The opposite sides of the cylinder blocks 106 are recessed to form portions of the combustion chambers 108 and 110 on opposite sides of the blocks. Spark plugs 112 and 114 extend through the cylinder walls and communicate with the combustion chambers 108 and 110 respectively, as shown.

The inner end of cylinder blocks 106 are circular in form to receive an annular-shaped rotatable member 116. The member 116 is provided with a pair of diametrically opposed arcuate-shaped blades 118.

The member 116 and the blades 118 are preferably double-walled to form a passageway 122 for the circulation of fluid or other suitable cooling medium. The member 116 is hollow longitudinally to form an annular passageway 124 for the introduction of a combustible charge of fuel and air as will be more fully described hereinafter. The member 116 is provided with ports 126, communicating with the annular passageway 124, and extending through the opposite side walls of the member 116 intermediate the arcuate-shaped blade members 118.

The blade members 118 are provided with scraper rings 128, which engage the inner surface of the wall 100 in fluid-tight relation to prevent fluid from passing between the ends of the blade members 118 and the inner surface of the wall 100. The cylinder blocks 106 are also provided with scraper rings 130 which engage the annular surface of the member 116 to prevent fluid from passing therebetween.

The annular member 116 and the arcuate-shaped blade members 118 are so proportioned that when moved to either extreme position one edge of the blades 118 lies closely adjacent the cylinder blocks 106, and the outer edge of the blades uncover exhaust ports 132 extending through the walls 100 and 102 of the power cylinder. In this position the ports 126, communicating with the passageway 124, are moved to a position to be uncovered by the inner surface of the cylinder blocks 106, whereupon communication is established between the passageway 124 and the combustion chambers 108 and 110.

A combustible mixture of fuel and air is supplied to the annular passageway 124, extending longitudinally through the member 116 by means of a blower or supercharger, one embodiment of which is illustrated in Figures 5 and 6.

The novel blower illustrated comprises a fixed cylindrical casing 150 having a plurality of arcuate-shaped longitudinally extending chambers 152 formed therein. The chambers 152 are bounded by the side wall members 154 and 156, and the annular-shaped wall 158 connecting the outer ends of the side wall members 154 and 156. The inner ends of the side walls of the adjacent chambers 152 are connected by annular-shaped walls 160, extending between the inner ends of the side wall members 154 and 156.

A fixed manifold 162, having a plurality of spaced longitudinally extending slots 164 through the side walls thereof is received within the central portion of the casing member 150. One end of the manifold 162 is closed by a plate 166, and the other end projects beyond the opposite end of the casing 150 and connects with the annular passageway 124 of the power unit illustrated in Figure 3.

A rotatable longitudinally disposed cylinder 168, having spaced ports 170 extending therethrough, is received within the casing 150. The cylinder 168 engages the inner surface of the annular-shaped walls 160 connecting the chambers 152, in fluid-tight relation, and is rotatable with respect thereto.

Impeller blades 172, fixed to and extending through the cylinder 168, project into the arcuate-shaped chambers 152, and oscillate back and forth between the walls 154 and 156.

The blades 172 are double-acting, having spaced side walls 174 and 176 provided with a plurality of longitudinally extending slots 178 projecting therethrough. The side walls 174 and 176 are extended into the space between the manifold 162 and the cylinder 168, and engage the manifold 162 in fluid-tight relation. A plurality of chambers 180 are thus formed within the cylinder 168, which communicate by way of the ports 170, with the arcuate-shaped chambers 152 under certain conditions of operation.

A solid web 182, positioned between the side walls 174 and 176 of the blades 172, extends through the cylinder 168, and engages the manifold 162 in fluid-tight relation. The web 182 is so positioned with respect to the slots 164 in the manifold 162 that the manifold is alternately subjected to pressures existing in the passages 184 and 186, positioned between the web 182 and the side walls 174 and 176 respectively, of the blades 172.

The cylinder 168, having the blades 172 fixed thereto, is rotatable between annular discs 188 and 190, closing the ends of the casing 150 and the manifold 162. One end of the chambers 180, positioned within the cylinder 168, is closed by a sleeve 192 journalled between the disc 188 and the manifold 162. A crank 193, fixed to the sleeve 192, operates to transmit oscillatory movement to the cylinder 168, carrying the blades 172. The other end of the chambers 180 communicates by way of a chamber 194 with a horizontally disposed carburetor 196. The carburetor 196 is controlled in the usual manner by a manually operable throttle valve 198 and a choke valve 200.

Figure 7:
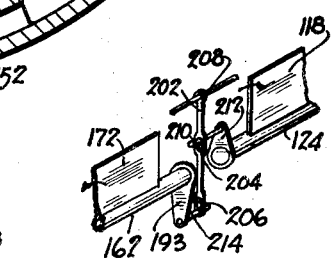
Figure 7 is a perspective view showing a linkage interconnecting the blower and the engine.

Figure 7 is a diagrammatic view illustrating a linkage operable to interconnect the blower and the power unit in such a manner that periodic vibrations are avoided by oscillating the movable parts of the two units in the reverse direction.

A link 202, having lost motion connection slots 204 and 206 is journalled on a shaft 208. A stud 210, carried by a crank 212, fixed to the power member 116, is received within the slot 204 of the link 202. A stud 214, carried by the crank 193, fixed to the cylinder 168 of the blower, is received within the slot 206 of the link 202.

As the power unit oscillates, the link 202 is oscillated about the shaft 208. The crank 212 driving the link 202 is moved in the opposite direction to the movement of the crank 193, driven by the link 202. The linkage thus operates to reverse the direction of oscillation between the two units. It is obvious, of course, that the length of the stroke of the blower unit may be varied with respect to the stroke of the power unit by merely extending or shortening the linkage. The annular passageway 124 and the manifold 162 may be connected by any suitable flexible connection to avoid interference with the link 202.

Figure 4:
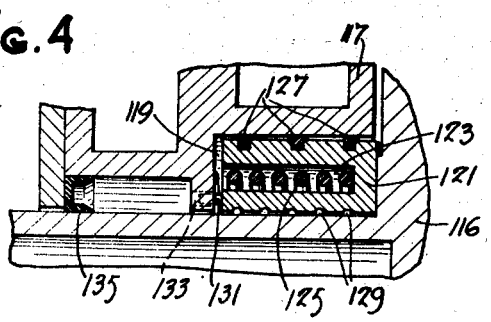
Figure 4 is a sectional view showing an improved fluid seal.

Figure 4 illustrates an improved seal adapted to prevent fluid pressure from escaping between the end walls of the annular-shaped member 116 and the end walls 117 closing the power unit and extending to the outer wall 102. The end walls 117 are provided with an annular recess 119 to receive an annular-shaped seal 121 having a recess 123 to receive a spring 125. The spring 125 yieldingly urges the seal 121 into engagement with the side walls of the annular-shaped member 116 as shown. The outer edge of the annular seal 121 is provided with a plurality of snap seal rings 127 to yieldingly engage the walls of the recessed portion 119. The inner edge of the annular seal 121 is provided with a plurality of annular traps 129 to trap any fluid escaping between the walls of the seal 121 and the annular-shaped member 116.

The seal 121 is anchored against rotation with the annular-shaped member 116 by means of pins 131 extending into apertures 133. The apertures 133 are larger than the pins 131 to permit slight movement of the annular seal 121. A double-faced resilient seal 135, formed of rubber or other suitable material, is interposed between the outer edge of the end walls 117 and the annular-shaped member 116 to prevent the escape of fluid between the two members.

Fluid pressure is prevented from passing between the end walls of the annular-shaped member 116 and the blades 118 by means of resilient snap rings (not shown) positioned in the end walls of the movable elements.

Discussing now the operation of the device illustrated in Figures 3 to 7, the blower shown in Figures 5 and 6 will first be discussed to show how a combustible mixture is supplied under pressure to the power unit illustrated in Figure 3.

A combustible charge of fuel and air is supplied to the chambers 180 positioned between the cylinder 168, and the side walls 174 and 176 of the impeller blades 172 by the carburetor 196. Assume that the blades 172 are in the position shown in Figure 5, and a cycle of operation is commenced. The blades 172 move in the counterclockwise direction within the arcuate-shaped chambers 152. A partial vacuum is then created between the web 182, of the blades 172, and the side walls 156 of the arcuate-shaped chambers. As the blades 172 approach the side walls 174, the port 170 through the side walls of the cylinder 168 moves beyond the annular-shaped inner walls 160, and connects the chambers 180 with the chambers 152 between the side walls 174 and 156. The fuel and air mixture contained in the chamber 180 then rushes into the chamber 152 between the side walls 156 and 174 to fill the chamber 152. It will be noted that during this cycle of operation, the passageways 184, positioned between the web 180 and the side wall 174 of the impeller 172, have moved beyond the slot 164, so as to be covered by the walls of the manifold 162.

The impeller blades 172 reverse direction upon reaching the side walls 154 and move in the clockwise direction, whereupon the port 170 is closed by the annular inner walls 160, to close the chamber extending between the impeller blades 172 and the side walls 156. The fluid pressure in this area is then increased in proportion to the extent of travel of the impeller blades 172, the fluid passing through the longitudinally extending slots 178 in the side walls 174 into the passageways 184. As the impeller continues to rotate in the clockwise direction, the passageways 184 register with the longitudinally extending slots 164 in the manifold 162, thereby permitting the fluid contained between the side walls 156 and 174 to flow through the passageway 184 into the manifold 162. A pressure is therefore exerted within the manifold 162.

It will be noted that the impeller blades 172 are double-acting, and that a compression stroke takes place as the blades 172 are moving in the counterclockwise direction, the fluid being compressed between the walls 154 and 176, and admitted to the manifold 162 when the passageways 186 register with the ports 164 in the manifold 162.

It is understood, of course, that any desired number of arcuate-shaped chambers 152 and impeller blades 172 may be employed to produce the desired pressure within the manifold 162. The pressure may also be raised by increasing the diameter of the unit.

Referring now to the power unit illustrated in Figure 3, it will be noted that the manifold 162 of the blower communicates with the annular passageway 124, extending longitudinally through the annular-shaped member 116. The ports 126, communicating with the passageway 124, are closed by the inner annular walls of the cylinder blocks 106 during all intermediate positions of the blades 118. When the blades 118 move to one extreme position, wherein the edges of the blades are moved adjacent the side walls of the cylinder blocks 106, the ports 126 rotate to such a position as to be uncovered by the inner surface of the cylinder blocks 106. The compressed charge contained in the annular passageway 124 is then admitted to the combustion chambers 108 or 110, depending upon the position of the blades 118.

Assume that the blades 118 are at the beginning of a power stroke in the combustion chambers 110, a combustible charge having been compressed on the previous stroke. The charge is then ignited by the spark plugs 114, extending into the combustion chambers 110, and the blades 118 are urged in the clockwise direction. During the initial portion of the stroke the arcuate-shaped blades 118 close the exhaust passages 132 in the inner surface of the cylinder blocks 106, and the annular-shaped member 116 closes the ports 126, thereby trapping a charge of fuel and air on the forward side of the blades 118. This charge is then compressed in the combustion chambers 108 as the power stroke of the combustion chambers 110 progresses. It will be noted that, during the greater portion of the power stroke, the exhaust and inlet ports are closed.

Toward the end of the power stroke, the trailing edge of the arcuate-shaped blade members 118 uncover the edge of the exhaust ports 132, thereby permitting the fire of combustion to escape from the combustion chambers 110, and shortly thereafter the ports 126 move beyond the inner end of the cylinder blocks 106 to interconnect the passageway 124 with the combustion chambers 110 through the ports 126. A combustible charge is then forced into the combustion chambers 110, to aid in scavenging the products of combustion through the exhaust ports 132, and to introduce the combustible charge for the next power stroke.

It will be noted that the power unit is double-acting, and that power strokes are initiated simultaneously upon the diagonally opposite sides of the blade members 118, each time the blade oscillates back and forth between two extreme positions.

The speed of the power unit is controlled by manipulating the throttle valve 198 of the carburetor 196 to thereby increase or decrease the quantity of a combustible mixture admitted to the blower, communicating with the annular passageway 124. The richness of the mixture supplied may be controlled by manipulating the choke valve 200 to vary the quantity of fuel and air admitted to the carburetor.

The blower and the power unit may both oscillate in the same direction, or if desired, the direction of oscillation of the two elements may be reversed by the linkage illustrated in Figure 7. By reversing the direction of oscillation, the periodical vibrations are broken up, so as to decrease vibration of the units. By changing the lever arms of the connecting members, it is possible to oscillate the impeller blades 172 through a longer stroke than the blades 118 oscillate through.

Figure 8:
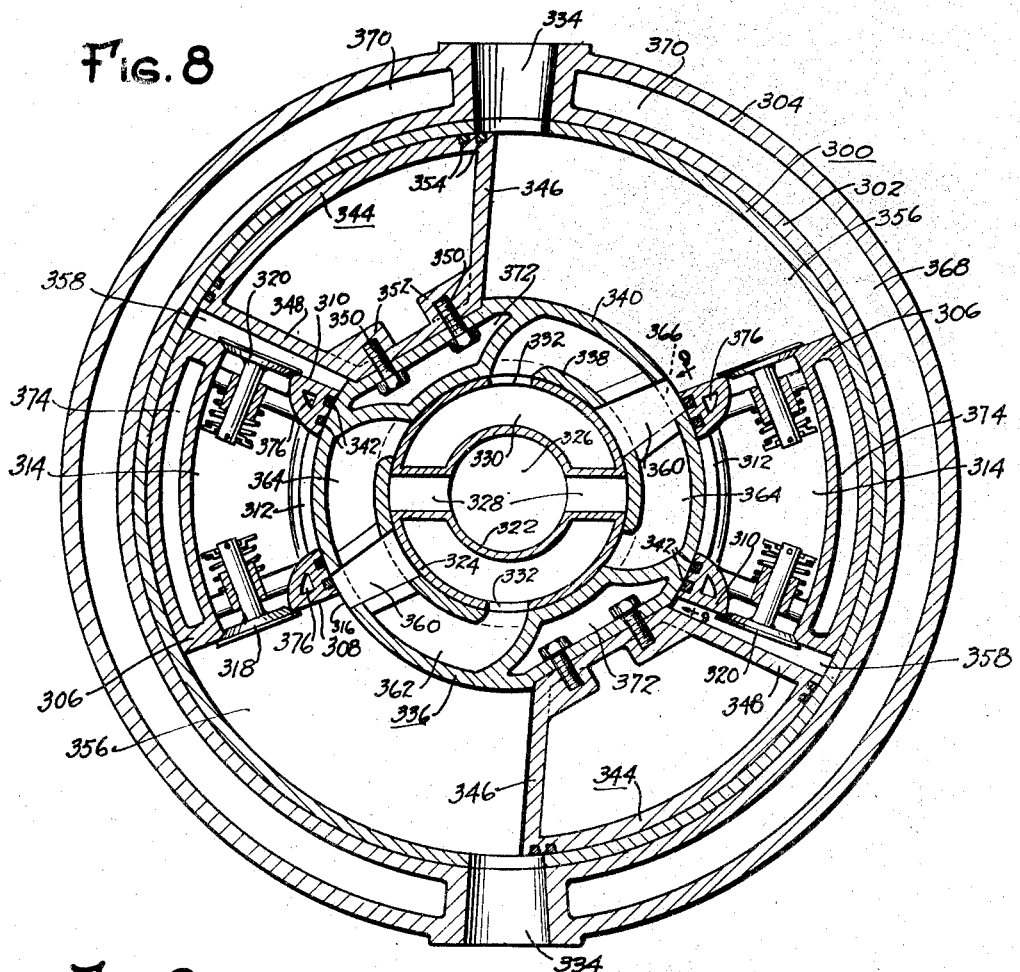
Figure 8 is a view similar to Figures 1 and 3 illustrating another desirable embodiment of the invention.

Figure 8 illustrates another desirable embodiment of the invention, wherein free air is injected into the combustion chambers at the end of the power stroke, to assist in scavenging the products of combustion therefrom. A rich emulsion of fuel and air is then injected into the combustion chambers during the early stages of the compression stroke to mix with the free air previously admitted, to form a combustible charge for the operation of the engine.

The power unit comprises a water jacketed longitudinally disposed cylinder 300 inserted within inner and outer walls 302 and 304 respectively. Arcuate-shaped longitudinally extending hollow cylinder blocks 306 are fixed within the cylinder 300 at opposite sides thereof, as shown.

The arcuate-shaped cylinder blocks 306 have side wall members 308 and 310 respectively, and an annular-shaped wall 312, connecting the inner ends of the wall members 308 and 310. A chamber 314 is thus formed within the blocks 306. The annular-shaped wall 312 is provided with a plurality of spaced ports 316 (Figure 9), more fully described hereinafter. The side wall members 308 and 310 of the cylinder blocks 306 are provided with pressure responsive valve members 318 and 320 respectively, opening out of the chamber 314.

Two concentric cylinders 322 and 324 are longitudinally fixed in the central portion of the cylinder 300. The cylinder 322 forms a high pressure chamber 326 provided with opposed longitudinally extending ports 328, extending through the cylinders 322 and 324, and directed toward the ports 316, positioned in the midsection of the annular-shaped walls 312 of the cylinder blocks 306.

The space between the cylinders 322 and 324 forms a low pressure chamber 330. Ports 332 extending through the walls of the cylinder 324 are directed toward a pair of opposed exhaust ports 334, extending through the cylinder 300 at a point midway between the cylinder blocks 306.

A hollow cylinder 336, preferably formed of high grade steel, is received between the cylinder 324 and the annular-shaped walls 312 of the hollow cylinder blocks 306. The inner surface 338 of the cylinder 336 engages the outer surface of the cylinder 324 in fluid-tight relation. The outer surface 340 of the cylinder 336 engages rings 342, positioned in the annular-shaped walls 312, of the cylinder blocks 306, in fluid-tight relation.

A pair of hollow arcuate-shaped blade members 344, having side walls 346 and 348, are fixed to the opposite sides of the cylinder 336 by any suitable means, such as the bolts 350, extending through a portion of the cylinder 336, and extending into bosses 352, formed in the blade members 344. The blade members are preferably formed of aluminum or other similar material to decrease the weight of the structure and to facilitate connecting the blades to the cylinder.

The arcuate-shaped blades 344 are provided with sealing rings 354 which engage the inner surface of the walls 302 in fluid-tight relation.

The blades 344, fixed to the cylinder 336, oscillate back and forth in the space between the valves 318 and 320, positioned in the cylinder blocks 306. Combustion chambers 356 and 358 are formed between the walls 308 and 310 of the cylinder blocks 306, and the side walls 346 and 348 of the arcuate-shaped blades 344, respectively.

A pair of opposed longitudinally extending ports 360, projecting through the hollow cylinder 336, are adapted to interconnect the opposed ports 328, communicating with the high pressure chamber 326, with the spaced ports 316, positioned in the annular-shaped walls of the cylinder blocks 306, when the blades 344 are moved to a position midway between the cylinder blocks 306.

Two pairs of by-pass chambers 362 and 364, positioned in the cylinder 336, are adapted to register with the ports 332 in the walls of the cylinder 324 to interconnect the low pressure chamber 330 and a plurality of ports 366 (Figure 9) when the blades 344 approach either extreme position, whereupon the ports 366 are moved to such a position as to be uncovered by the annular-shaped wall 312.

This power unit is fluid-cooled by water or other suitable substance circulated in the water passages 368 between the inner and outer walls 302 and 304 of the cylinder 300, and water passages 370 in the arcuate-shaped blade members 344. Other fluid circulating passages 372 are positioned within the movable hollow cylinder 336, and the passages 374 and 376 positioned within the hollow cylinder blocks 306 and 308.

In the operation of this device a rich mixture of fuel and air is supplied to the high pressure chamber 326 by means of a blower having a carbureting unit attached thereto, similar to the one illustrated in Figures 5 and 6. Another blower of any suitable type may be employed to supply free air to the low pressure chamber 330.

Assume that the hollow cylinder 336, having the blade members 344 fixed thereto, is in the position shown in Figure 8. A charge of combustible mixture will have been compressed within the combustion chambers 358 and ignited by spark plugs (not shown). The power stroke will thereupon be initiated, at which time the blade members 344 will be moved in the clockwise direction, a quantity of free air having been injected from the low pressure chamber 330 through the ports 332; by-pass chambers 362 and the ports 366 into the space between the walls 308 of the cylinder blocks 306 and the side walls 346 of the blade members 344. This quantity of free air will assist in scavenging the products of combustion from the last firing stroke, through the exhaust ports 334 and supply a quantity of free air within the combustion chambers 356. As the blades 344 continue to rotate in the clockwise direction, the side walls 346 close the exhaust ports 334 and the ports 366 in the cylinder 336 are closed by the annular-shaped walls 312, whereupon communication between the low pressure chamber 330 and the combustion chambers 356 is interrutped.

Further movement of the blade members 344 in the clockwise direction will rotate the opposed longitudinally extending ports 360, extending through the walls of the cylinder 336, into alinement with the spaced ports 328 between the cylinders 322 and 324, and the spaced ports 316 positioned in the annular-shaped walls 312, of the cylinder blocks 306. The high pressure chamber 326 is then connected with the chambers 314, whereupon a mixture of fuel and air, compressed in the high pressure chamber 326, will flow into the chambers 314. The pressure of the gases will urge the valve members 318 outwardly, thereby opening communication between the high pressure chamber 326 and the combustion chambers 356, to admit a suitable quantity of fuel and air, to be mixed with the free air supplied through the by-pass chambers 362 to form a suitable combustible mixture within the combustion chambers 356.

As the blade members 344 continue to rotate in the clockwise direction, the side walls 346 of the blades compress the charge thus admitted into the chamber, and when the pressures within the chambers 356 are equal to the pressure urging the valve members 318 toward the open position, the valve members 318 will be closed, thereby trapping the combustible mixture within the combustion chambers 356 for the next power stroke.

As the blades 344 continue to move in the clockwise direction, the combustible mixture in the combustion chambers 356 is compressed, whereupon the movement of the blades 344 is resiliently opposed, thereby giving a cushioning action toward the end of the power stroke previously initiated in the combustion chambers 358. Toward the end of the power stroke in the combustion chambers 358, the side walls 348 of the blades 344 uncover the exhaust ports 334 to permit the products of combustion to escape from the combustion chambers 358, at which time communication will be established between the low pressure chamber 330 and the combustion chambers 358 through the ports 332 and the walls of the cylinder 324, and the by-pass chambers 364 in the hollow cylinder 336.

The charge compressed within the combustion chambers 356 will then be ignited by spark plugs (not shown in this figure) extending through the walls of the cylinder 300. The blades 344 and the cylinder 336 will then oscillate in the counter-clockwise direction, whereupon the high pressure chamber 326 will be interconnected with the chambers 314 in the cylinder blocks 306, by way of the ports 360 through the walls of the cylinder 336 and the spaced ports 316 in the annular-shaped wall 312, to supply a rich mixture to the chambers 314. The valves 320 will thereupon be opened and a rich mixture of fuel and air injected into the combustion chambers 358 to mix with the free air previously admitted into the chamber to form a suitable combustible charge for the next power stroke of the engine.

This process is continued, the blade members 344 and the cylinder 336 oscillating back and forth between the cylinder blocks 306. Power strokes are initiated simultaneously on opposite sides of the blades 344 each time the blades reverse direction.

As indicated above, the end of each power stroke is cushioned by compressing the combustible charge in the opposed combustion chambers for the next power stroke so that very smooth operation of the engine is effected.

Figure 9:
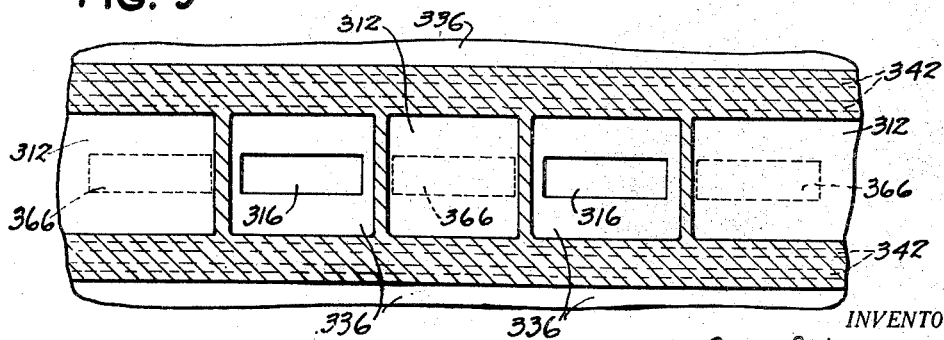
Figure 9 is a view taken on the line 9—9 of Figure 8.
Figure 10:
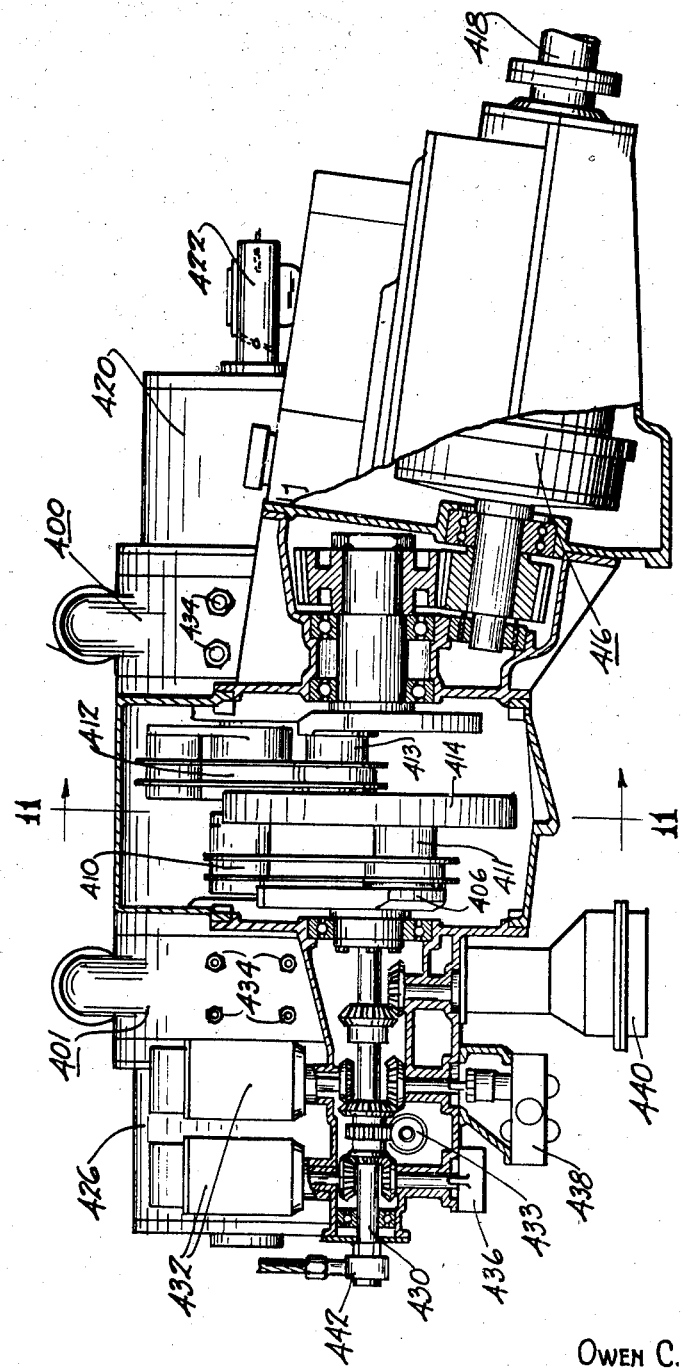
Figure 10 is an elevational view partly in section, illustrating one embodiment of the invention.
Figure 11:
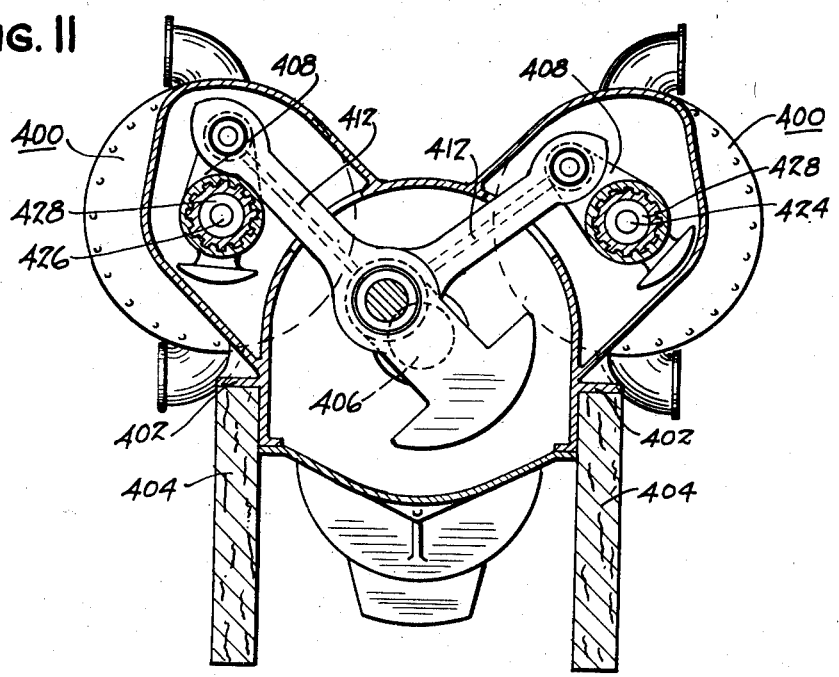
Figure 11 is a view taken substantially on the line 11—11 of Figure 10.

Figures 9, 10 and 11 illustrate one of the many types of engines which may be constructed embodying the features of the present invention. In these figures a marine type engine is shown, wherein two pairs of power units 400 and 401 of the type previously discussed, are employed. These power units are positioned to form a V-type engine having support arms 402, adapted to engage the supports 404 to mount the engine in a boat. A two-throw, counterbalanced crank shaft 406 is positioned between the two pairs of power heads 400 and 401 and is connected to the oscillating members 408 of the power units by two pairs of connecting rods 410 and 412. The connecting rods transform the oscillatory movement of the bladed power members into rotary movement of the crank shaft 406. The connecting rods 410 and 412 of the power units 400 and 401, respectively, connect with the spaced cranks 411 and 413 of the crank shaft 406, so that the power impulses of the units 400 and 401 act upon the crank shaft 406 to rotate it. A flywheel 414 is interposed between the cranks 411 and 413 of the crank shaft 406 to supply the necessary inertia for the smooth operation of the engine.

In this embodiment of the invention, a transmission of any desired type having reverse gears, indicated generally by the reference numeral 416, is positioned at one end of the crank shaft 406 to transmit power to a drive shaft 418 to drive any desired mechanism.

In the illustrated embodiment, high pressure blowers 420, positioned adjacent the power units 400 and provided with carbureting devices 422, supply a rich emulsion of fuel and air to the high pressure chambers 424 of the power units. Low pressure blowers 426, positioned adjacent the power units 401, supply free air to the low pressure chambers 428.

An accessory drive shaft 430, driven by the crank shaft 406, extends therefrom to drive two magnetos 432, driven as shown. Two other magnetos are driven and synchronized by the power take-off 433, adapted to supply current to the spark plugs 434 to ignite the combustible mixture compressed within the power units 400 and 401. The shaft 430 also drives a fuel pump 436, a water circulating pump 438, and an oil pump 440. A tachometer 442 is positioned at the end of the accessory shaft 430 to record the speed of the crank shaft 406.

It is obvious that the power units 400 and 401 operate simultaneously, the high pressure combustible mixture being supplied to all four power units by the high pressure blower 420, and the free air supplied to both pairs of power units 400 and 401 by the low pressure blower 426.

Figure 12:
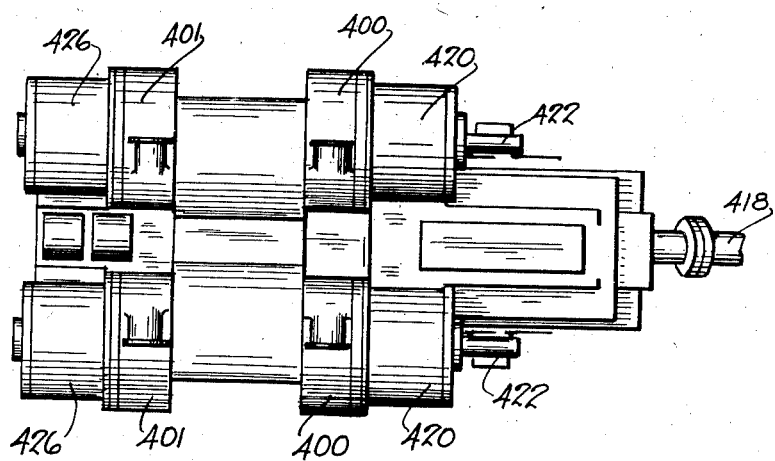
Figure 12 is a plan view of the invention shown in Figure 10.

Figures 12 and 13 illustrate a different embodiment of the invention adapted particularly for use where it is desirable that the engine be comparatively thin, such as where the engine is positioned in the wing of an airplane.

In the embodiment illustrated eight power units are positioned in two vertical planes.

A crank shaft 500, having a flywheel 502 positioned between two offset cranks 504 and 506, passes longitudinally through the midpoint of the group of power units.

The four power units 508, positioned above the flywheel 502 of Figure 12, are provided with oscillating power cranks 510. The cranks 510 are connected to the crank 504 of the crank shaft 500 by a master rod 512 and three articulated rods 514.

The four power units 516, positioned below the flywheel 502 of Figure 12, are provided with oscillating power cranks 518. The cranks 518 of the power units 516 are connected to the crank 506 of the crank shaft 500 by a master rod 520 and three articulated rods 522.

The power units 508 and 516 are provided with superchargers 524 and 526 respectively, to supply a suitable charge of combustible mixture to the power units 508.

In this embodiment of the invention it will be noted that thirty-two power impulses are exerted upon the crank shaft 500 each time it rotates.

Figure 15 shows an embodiment of the invention wherein six power units 600 are positioned about a crank shaft 602 to form a radial engine designed particularly for use with aircraft.

The power units 600 are provided with oscillating cranks 604 connected to an offset crank 606 of the crank shaft 602 by a master rod 608 and five articulated rods 610. The offset crank 606 is counterbalanced by weights 612 carried by the crank shaft 602.

In this embodiment of the invention it will be noted that twenty-four power impulses are exerted upon the crank shaft 602 each time it revolves. If desired, another set of six oppositely disposed power units, and a double-throw crank shaft may be employed to increase the power. In that arrangement forty-eight power impulses will be exerted upon the crank shaft each time it rotates.

Figure 16 shows a still further embodiment of the invention wherein two power units 700 are positioned on opposite sides of counterbalanced crank shaft 702 to form an opposed engine designed particularly for use as an "outboard motor" to propel small watercraft.

The power units 700 are provided with oscillating cranks 704 connected to the opposed cranks 706 of the crank shaft 702 by means of the connecting links 708.

In this embodiment eight power impulses will be exerted upon the crank shaft 702 each time it revolves.

In the embodiments illustrated in Figures 15 and 16, any desired type of supercharger may be employed to inject a combustible charge into the combustion chambers of the power units.

While the invention has been described with reference to certain specific embodiments thereof, it is not intended to limit the scope of the invention to the embodiments shown, nor otherwise than by the terms of the following claims.

I claim:

1. A fluid-cooled engine having a cylinder, equally spaced arcuate-shaped cylinder blocks having annular-shaped inner and outer walls fixed in the cylinder at the central section thereof longitudinally of the cylinder to form annular-shaped grooves between the blocks and the cylinders, a movable annular-shaped hollow member positioned in the cylinder and engaging the annular-shaped inner walls of the cylinder blocks, a plurality of equally spaced blades fixed to the annular-shaped member and adapted to oscillate in the cylinder between the side walls of the arcuate-shaped cylinder blocks, combustion chambers between opposite faces of alternate cylinder blocks and adjacent faces of blades, compression chambers between opposite faces of alternate cylinder blocks and adjacent faces of blades, means to separate the annular-shaped member to form high pressure by-pass chambers and a low pressure chamber, means including a carburetor to supply a charge of combustible mixture to the low pressure chamber, means to by-pass the charge from the low pressure chamber to the compression chambers, means to force the charge from the compression chambers to the by-pass chambers, means to by-pass the charge from the by-pass chambers to the combustion chambers, spaced exhaust ports positioned in the combustion chambers, and means including annular shroud members carried by the blades to prevent the exhaust ports from communicating with the compression chambers, the shroud members being receivable into said annular-shaped grooves.

2. An engine having a cylinder, spaced arcuate-shaped hollow cylinder blocks having annular-shaped inner walls fixed in the walls of the cylinder, a plurality of spaced ports in said annular-shaped inner walls, pressure responsive valve members in the side walls of the arcuate-shaped cylinder blocks, a small cylinder forming a high pressure passage extending longitudinally through the first-named cylinder, a larger cylinder concentric with the small cylinder and forming a low pressure chamber intermediate said cylinders, spaced ports extending from the high pressure chamber through the low pressure chamber and directed toward the spaced ports in said annular-shaped inner walls of the cylinder blocks, exhaust ports through the walls of the first-named cylinder midway between the cylinder blocks, spaced ports in the walls of said larger cylinder directed toward the exhaust ports, a movable cylinder positioned between the larger cylinder and the cylinder blocks, a plurality of arcuate-shaped equally spaced blades fixed to the movable cylinder and adapted to oscillate in the first-named cylinder between the cylinder blocks, and means including ports extending through the movable cylinder to interconnect the high pressure passage with the spaced ports in the cylinder blocks and to interconnect low pressure chamber with the first-named cylinder between the side walls of the cylinder blocks and the blades.

3. In a fluid-cooled internal combustion engine having a cylinder, spaced arcuate-shaped hollow cylinder blocks having annular-shaped inner walls fixed in the walls of the cylinder, a plurality of spaced ports in said annular-shaped inner walls, pressure responsive valve members in the side walls of the arcuate-shaped cylinder blocks, a small cylinder forming a high pressure passage extending longitudinally through the first-named cylinder, a larger cylinder concentric with the small cylinder and forming a low pressure chamber intermediate said cylinders, spaced ports extending from the high pressure chamber through the low pressure chamber and directed toward the spaced ports in said annular-shaped inner walls of the cylinder blocks, exhaust ports through the walls of the first-named cylinder midway between the cylinder blocks, spaced ports in the walls of said larger cylinder directed toward the exhaust ports, a movable cylinder positioned between the larger cylinder and the cylinder blocks, a plurality of arcuate-shaped blades fixed to the movable cylinder and adapted to oscillate in the first-named cylinder between the cylinder blocks, means including ports extending through the movable cylinder to interconnect the high pressure passage with the spaced ports in the cylinder blocks and to interconnect low pressure chamber with the first-named cylinder between the side walls of the cylinder blocks and the blades, means to supply a combustible mixture of fuel and air to the high pressure passage under high pressure, and means to supply free air to the low pressure chamber.

4. An engine having an annular cylinder, a plurality of radially disposed arcuate shaped evenly spaced abutments in the annular cylinder, said abutments having annular shaped inner walls, an annular shaped oscillating piston positioned in the cylinder and having a plurality of radially extending vanes one between each pair of adjacent abutments engaging the annular shaped inner walls of the abutments and adapted to oscillate in the cylinder between the side walls of the arcuate shaped cylinder blocks, alternate combustion and compression chambers in the cylinder between opposite faces of alternate cylinder blocks and adjacent faces of said vanes, means to separate the annular shaped member to form high pressure bypass chambers and a low pressure chamber between the compression and combustion chambers, means including a carburetor to supply a charge of combustible mixture to the low pressure chamber, means to bypass the charge from the low pressure chamber to the compression chamber, means to force the charge from the compression chambers to the bypass chambers, means to bypass the charge from the bypass chambers to the combustion chambers, and exhaust outlet means in the walls of the annular cylinder, said exhaust outlet means being controlled by said vanes.

5. An internal combustion engine of the two-cycle type having a fixed hollow outer cylinder, a plurality of equally spaced radially disposed arcuate shaped cylinder blocks fixed in the cylinder, a fixed longitudinally extending member positioned in the cylinder, a movable element, an oscillating piston with a plurality of vanes, one of said vanes being positioned between each pair of adjacent blocks and adapted to oscillate in the cylinder between the cylinder blocks, compression and combustion chambers in the cylinder formed by said vanes and abutments, means to supply air to the oscillating piston, bypass means to discharge said air to the combustion chambers to aid in scavenging the products of combustion from the combustion chamber, means to supply a rich mixture of fuel and air from said fixed element to the combustion chambers after the supply of scavenging air from the oscillating piston has been closed, and exhaust outlet means through the walls of the outer cylinder midway between the cylinder blocks controlled by the oscillating vanes.

OWEN C. LINTHWAITE.